United States Patent
Gross et al.

(10) Patent No.: US 8,560,579 B1
(45) Date of Patent: Oct. 15, 2013

(54) SYSTEMS AND METHODS FOR MANAGING A NETWORK BY GENERATING FILES IN A VIRTUAL FILE SYSTEM

(75) Inventors: Dor Gross, Ganey-Tiqwa (IL); Cos Nicolaou, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/548,739

(22) Filed: Jul. 13, 2012

Related U.S. Application Data

(60) Provisional application No. 61/578,661, filed on Dec. 21, 2011.

(51) Int. Cl.
*G06F 17/30* (2006.01)

(52) U.S. Cl.
USPC ........... 707/822; 707/609; 707/705; 707/821; 707/823; 707/824; 707/825; 707/826; 707/827; 707/828

(58) Field of Classification Search
USPC .................. 707/609, 705, 821–828
See application file for complete search history.

(56) References Cited

U.S. PATENT DOCUMENTS

| | | | | |
|---|---|---|---|---|
| 6,393,435 B1 * | 5/2002 | Gartner et al. | ......................... | 1/1 |
| 7,725,437 B2 * | 5/2010 | Kirshenbaum et al. | ........ | 707/640 |
| 7,739,240 B2 * | 6/2010 | Saito et al. | ..................... | 707/634 |
| 7,856,437 B2 * | 12/2010 | Kirshenbaum | ............... | 707/737 |
| 2004/0009813 A1 * | 1/2004 | Wind | ................ | 463/30 |
| 2004/0111390 A1 * | 6/2004 | Saito et al. | ......................... | 707/1 |
| 2004/0111441 A1 * | 6/2004 | Saito et al. | ..................... | 707/200 |
| 2009/0037500 A1 * | 2/2009 | Kirshenbaum | ............... | 707/206 |
| 2011/0035376 A1 * | 2/2011 | Kirshenbaum | ............... | 707/737 |
| 2012/0284317 A1 * | 11/2012 | Dalton | .......................... | 707/827 |

* cited by examiner

Primary Examiner — Frantz Coby
(74) Attorney, Agent, or Firm — Ropes & Gray LLP

(57) ABSTRACT

Systems and methods for generating files in a virtual file system in the memory of a network system are discussed. The network system receives a filename including at least one file metadata. The file metadata includes a file size of the file, a random seed for generating content of the file, and modification information of the file. File content for the file may be generated based on the filename. The file content may then be provided to the network system.

26 Claims, 8 Drawing Sheets

US 8,560,579 B1

SYSTEMS AND METHODS FOR MANAGING A NETWORK BY GENERATING FILES IN A VIRTUAL FILE SYSTEM

CROSS-REFERENCE TO RELATED APPLICATIONS

This application claims the benefit under 35 U.S.C. §119 (e) of U.S. Provisional Application No. 61/578,661 filed Dec. 21, 2011, which is hereby incorporated by reference herein in its entirety.

FIELD OF THE DISCLOSURE

This disclosure relates to a method and system for managing a network by generating files in a virtual file system. More particularly, this disclosure relates to generating and verifying content of a file in a virtual file system using characteristics of the file.

BACKGROUND

As the global demand for accessing online content increases, multiple network systems are needed to provide the content. Network systems send and replicate data among one another in order to deliver the same data globally, e.g., to other networks. The amount of data transferred between network systems is usually large, which can take a considerable amount of time to transfer and can be costly in terms of bandwidth usage. In some cases, the total network bandwidth of the network systems can limit the amount of data sent at a time and affect other services and applications running in the network systems.

Network bandwidth is an important commodity that can be optimized, for example, for usage and allocation. In order to optimize network bandwidth, processes may be used to determine network bandwidth limit and capacity, and test the network in situations where future demands exceed or differ from current demands. Such processes should be performed with as little impact as possible on the network systems and the applications and services running on the network systems. Techniques described herein may be used to test the network while taking into consideration resources and applications running on the network systems.

SUMMARY

Accordingly, some implementations relate to a non-transitory computer readable medium that stores computer executable instructions, which when executed by a processor, cause the processor to carry out a method for generating content of a file in an in-memory file system. A filename is received comprising at least one file metadata. The file metadata includes a file size of the file, a random seed for generating content of the file, and modification information of the file. File content for a file is generated based on the filename, and the file content is provided to the network system.

Some implementations relate to a non-transitory computer readable medium that stores computer executable instructions, which when executed by a processor, cause the processor to carry out a method for verifying content of a file in an in-memory file system. The network system receives a file and determines a filename of the file. File metadata is determined from the filename of the file. The file metadata includes a file size of the file, a random seed for generating content of the file, and modification information of the file. File content of the file is then verified based on the file metadata and the filename of the file.

Some implementations relate to systems for generating content of a file in an in-memory file system. The system includes a processor and memory which stores computer executable instructions. When the instructions are executed by the processor, the processor directs the system to receive a filename comprising at least one file metadata. The file metadata includes a file size of the file, a random seed for generating content of the file, and modification information of the file. The system is also directed to generate file content for a file based on the filename and provide file content to the system.

Some implementations relate to systems for verifying content of a file in an in-memory file system. The system includes a processor and memory which stores computer executable instructions. When the instructions are executed by the processor, the processor directs the system to receive a file and determine a filename of the file. The system also determines file metadata from the filename of the file. The file metadata includes a file size of the file, a random seed for generating content of the file, and modification information of the file. File content of the file is verified based on the file metadata and the filename of the file.

Some implementations relate to systems for generating content of a file in an in-memory file system. The system includes a first computer system and a second computer system. The first computer system includes a processor and memory, which contains instructions that when executed by the processor, cause the processor to direct the first computer system to receive a filename. The filename includes at least one file metadata. The file metadata includes a file size of the file, a random seed for generating content of the file, and modification information of the file. The system generates file content based on the filename of the file and provides the file content back to the system. The second computer system includes a processor, and memory, which contains instructions that when executed by the processor, cause the processor to direct the second computer system to receive file content of a file. The system determines a filename of the file and determines file metadata from the filename of the file. The file metadata includes a file size of the file, a random seed for generating content of the file, and modification information of the file. The system then verifies the file content of the file based on the file metadata and the filename of the file.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

To provide an overall understanding of the disclosure, certain illustrative implementations will now be described, including systems and methods for generating files in a virtual file system. However, it will be understood by one of ordinary skill in the art that the systems and methods described herein may be adapted and modified as is appropriate for the application being addressed and that the systems and methods described herein may be employed in other suitable applications, including networked computing systems, data center systems, and cloud computing systems, and that such other additions and modifications will not depart from the scope thereof.

Figure 1:
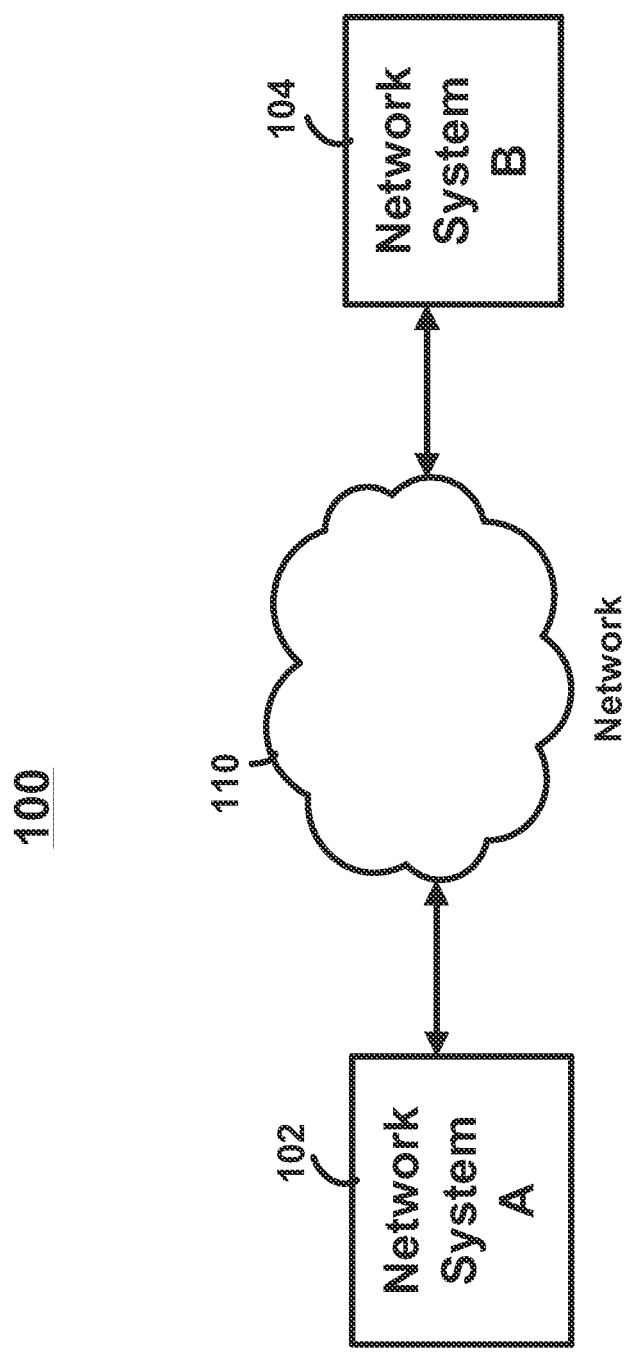
FIG. 1 is a simplified representation of multiple network systems transferring data through a network in accordance with an implementation of the disclosure.

FIG. 1 shows a simplified representation 100 of multiple network systems 102 and 104 transferring data through a network 110. Network systems 102 and 104 communicate with each other through network 110. Each network system 102 and 104 may include control circuitry configured to control the operation of its respective network system. Processes and operations performed by each network system 102 and 104 may be implemented using the control circuitry.

In order to determine network capacity and bandwidth of network 110, data transfers between multiple network systems are performed. The data transfers may be used to test single or multiple routes through network 110 between the different network systems. For example, data from network system 102 is sent over network 110 to network system 104. The data sent between the network systems may include data files stored within network system 102. Systems and applications within network system 102 provide the data files which are received by network system 104.

Figure 2:
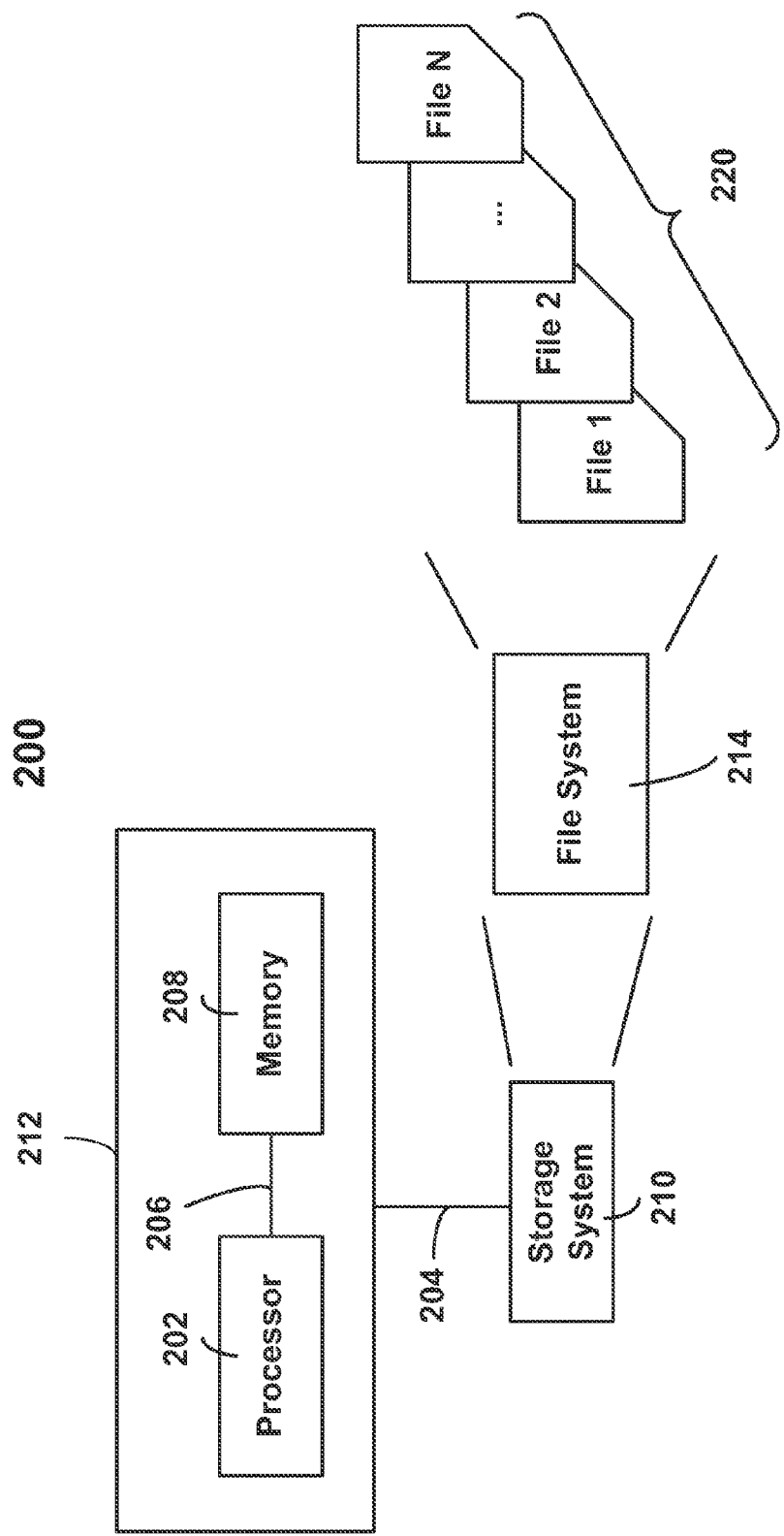
FIG. 2 is a simplified representation of a network system and a file system within the network system in accordance with an implementation of the disclosure.

FIG. 2 shows a simplified representation of a network system 200 and a file system 214 within network system 200. One of skill in the art would appreciate that network system 200 could be implemented using various arrangements. In one implementation, network system 200 includes computing system 212 and storage system 210. Computing system 212 includes processor 202 and memory 208. Processor 202 and memory 208 communicate with each other through data bus 206. Storage system 210 communicates with computing system 212 through a communicate path 204, which allows communication between processor 202, memory 208, and storage system 210. Communication path 204 may be a data bus, or a network connection through a network, such as network 110. Storage system 210 includes a file system 214 which manages data, such as data files 220, which are stored on storage system 210. Applications that run on network system 200, access data files 220 on storage system 210 through file system 214 and provide data files 220 for transfer to different network systems. In some implementations, an application programming interface (API) is used by an application to access data files 220. The API provides a common interface between the applications and file system 214 for accessing data files 220 on storage system 210. The API provides commands which can, for example, modify, create, read, or determine characteristics of data on the storage system 210. Examples of commands provided by an API are reading to data files 220, writing to data files 220, determining the characteristics of a data file 220, and deleting data files 220.

Network system 200 may include processor 202, memory 208, and storage system 210. Data bus 206 and communication path 204 may allow communication between each of these components together in any combination, and is not limited to the components shown in FIG. 2. For example, multiple processors 202, memories 208, and storage systems 210 may be used. Each storage system 210 may include a different or similar file system 214. A common API or a set of APIs may be provided on network system 200 to access data files 220 on each of the storage systems 210 for any file system 214. Furthermore, each storage system 210 may include multiple file systems 214 on the same storage system 210. This allows different types of data to be managed differently by a particular file system 214.

Processor 202 in network system 200 may act as the control circuitry which reads instructions from either memory 208 or storage system 210, to perform the operations of network system 200. Memory 208 includes non-transitory memory which may be implemented as volatile or non-volatile memory, such as FLASH memory, ROM, RAM, or other memory storing technologies. Storage system 210 includes non-transitory data storing devices, such as electromagnetic storage devices, mechanical storage devices, and volatile or non-volatile storage devices. Storage system 210 may also be connected to network system 200 through network 110.

Figure 3:
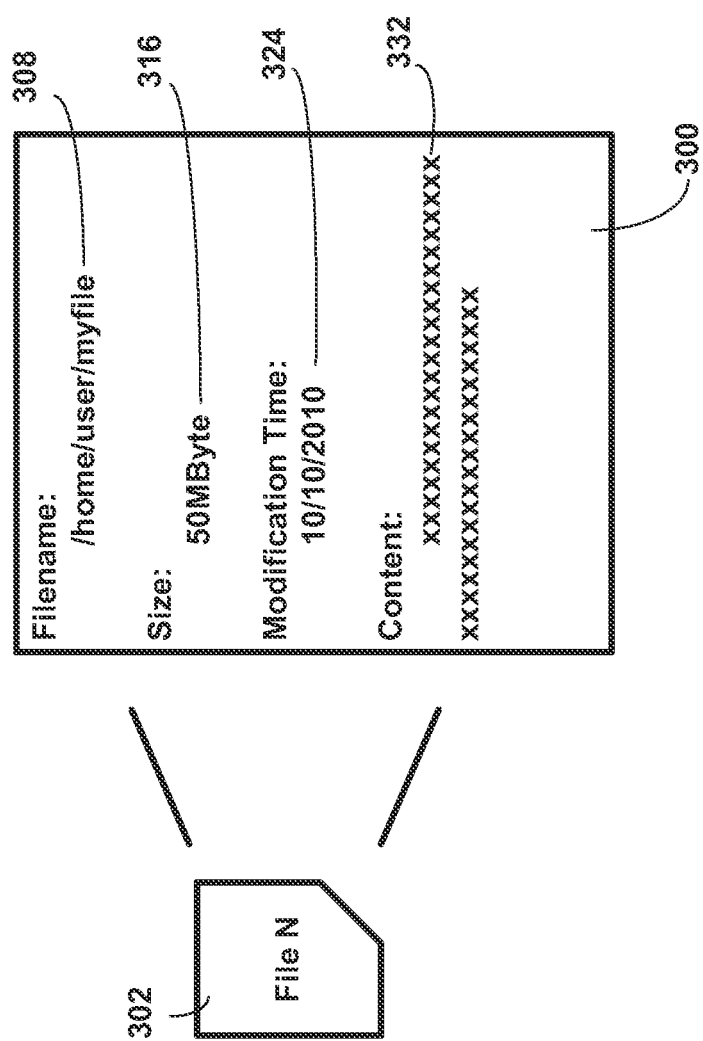
FIG. 3 is a simplified representation of file characteristics of a file within a file system in accordance with an implementation of the disclosure.

FIG. 3 shows a simplified representation of file characteristics 300 of a file 302 within a file system 214. Each file 302 managed by file system 214 includes file characteristics 300 which describe properties of file 302. These file characteristics 300 include, for example, filename 308, file size 316, file dates 324, and content 332 of file 302 or information about the content 332. Filename 308 is a string of characters which identifies a file 302 and is unique within a file system 214. Filename 308 may include the name of file 302 and the absolute path in file system 214 where file 302 is located. File size 316 of file 302 describes the amount of data content 332 stored on file system 214 for that file 302. File dates 324 of a file 302 describe dates related to file 302. These dates may include modification dates, creation dates, or any date which may provide details about actions performed or related to file 302. Content 332 of file 302 is the data of file 302 itself. Different file characteristics 300 of a file 302 may be dependent on file system 214 which manages file 302. Any number of file characteristics 300 may be implemented based on the file system used to manage file 302.

When a transfer of data is performed between multiple network systems, such as between network systems 102 and 104, the data is provided by storage system 210. The performance of the data transfer is dependent on performance characteristics of storage system 210 and file system 214 that provides the data being transferred. Examples of performance characteristics are characteristics of the storage system 210, such as access times, seek times, transfer times of each read and write access from storage system 210, and network related overheads of storage system 210, if storage system 210 communicates through a network, and software overheads of storage system 210 or file system 214, such as execution time of firmware in storage system 210 or execution time of the file system 214 API when accessing files within storage system 210. For example, the data transfer rate of transferring a data file 302 may be based on read/write transfer rates, read/write seek times, and read/write access times of accessing data files 302 within storage system 210.

The performance characteristics of storage system 210 may limit the maximum transfer rate of a data transfer, preventing network 110 from being tested for its maximum network capacity. Furthermore, it may be difficult to determine the network capacity of network 110 because storage system 210 may not contain enough stored data to meet the maximum network capacity of network 110. Therefore, in some implementations, a virtual file system may be implemented by computing system 212 to generate and verify data files, to determine the network capacity of network 110. Memory 208 may be used to store the generated data files, instead of storage system 210. Memory 208 may have better performance characteristics than storage system 210, allowing higher maximum transfer rates to be achieved, which can meet the maximum network capacity of network 110. Moreover, by using memory 208, data transfers which test the network capacity and bandwidth of network 110 may be offloaded from storage system 210 onto memory 208, freeing up valuable resources of storage system 210 for other applications in the network systems. Additionally, by using a virtual file system, the throughput of network system 200, factoring out delays of storage system 210 and file system 214, may be determined. This allows us to determine the true performance of an application or service without delays introduced by storage system 210 or file system 214.

Figure 4:
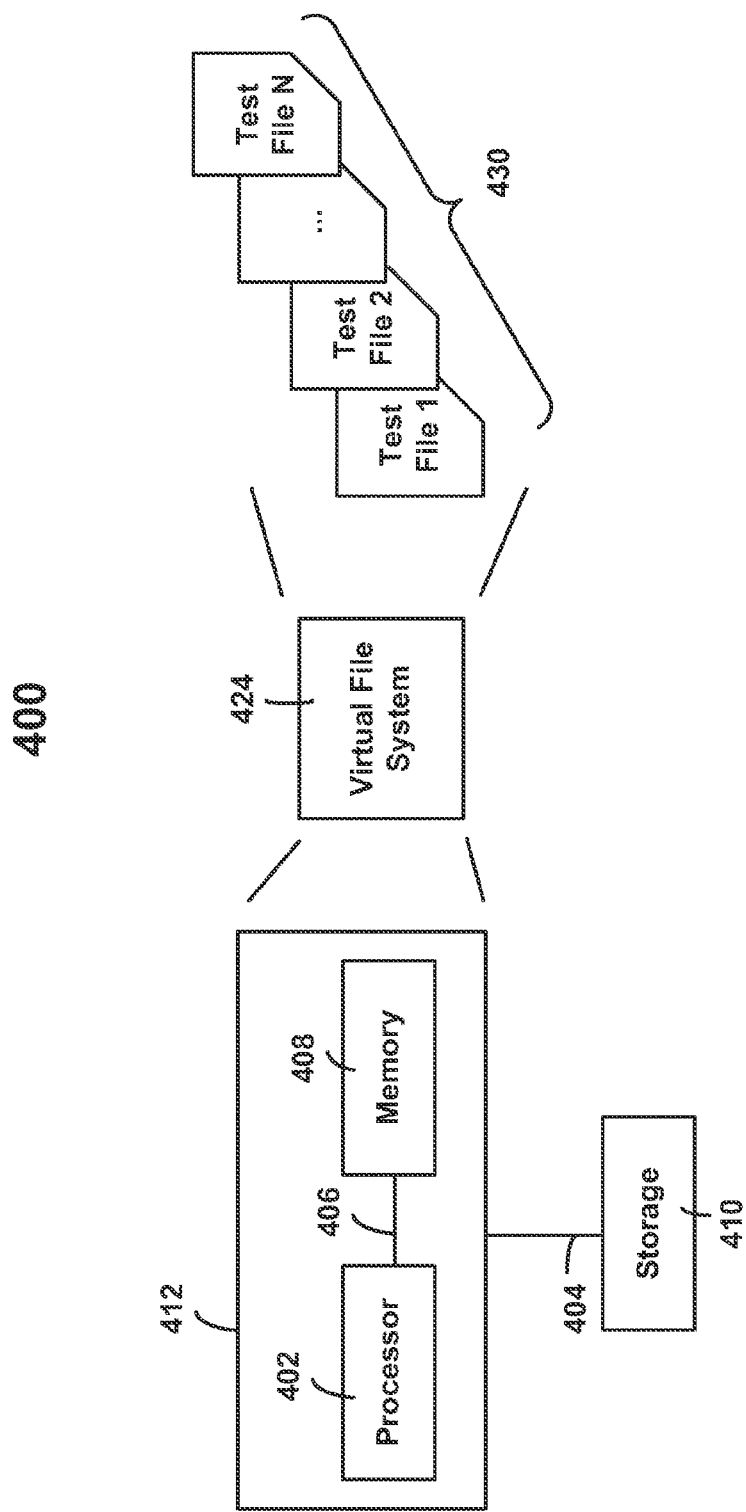
FIG. 4 is a simplified representation of a virtual file system within a network system in accordance with an implementation of the disclosure.

FIG. 4 shows a simplified representation of a virtual file system 242 within a network system 400. Network system 400 includes processor 402, memory 408, and storage system 410, which communicate with each other through data bus 406 and communication path 404. Computing system 412, which includes processor 402 and memory 408, generates data content for test files 430. Data content which is generated for test files 430 by processor 402 is stored in memory 408, which then may used by an application which requested the data content for test files 430. Computing system 412 generates test files 430 through an application along with an API. The system, API, and applications, which generates and manages test files 430 using computing system 412, may be referred to as virtual file system 424.

Similar to a file system 214 on a storage system 410, the virtual file system 424 provides information about test files 430 managed by the virtual file system 424. The difference is that the test files 430 on the virtual file system 424 do not necessarily correspond to actual files stored in memory 408. The test files 430 are created on demand, when an application requests a test file 430 through the API for the virtual file system 424. Test files 430, unlike regular files 220, may include only the filename and may be missing certain file characteristics of the test file, such as the content of the test file 430.

The content of test file 430 may be generated on demand, thereby allowing the content to not be stored in memory 408, which would utilize valuable memory space. In some implementations, only the requested content of test file 430 needs to be generated and not the entire test file 430, which reduces memory consumption. In some implementations, the entire test file 430 may be generated when a request for test file 430 is received. Generating the content of a test file 430 on demand also allows the virtual file system 424 to generate an unlimited amount of data to be transferred, along with a virtually unlimited number of test files 430, since the only data which needs to be stored are the filenames of test files 430. Though test files 430 may be generated by the virtual file system 424, file characteristics of test file 430 may be generated allowing test file 430 to be used like a regular data file 220.

Figure 5:
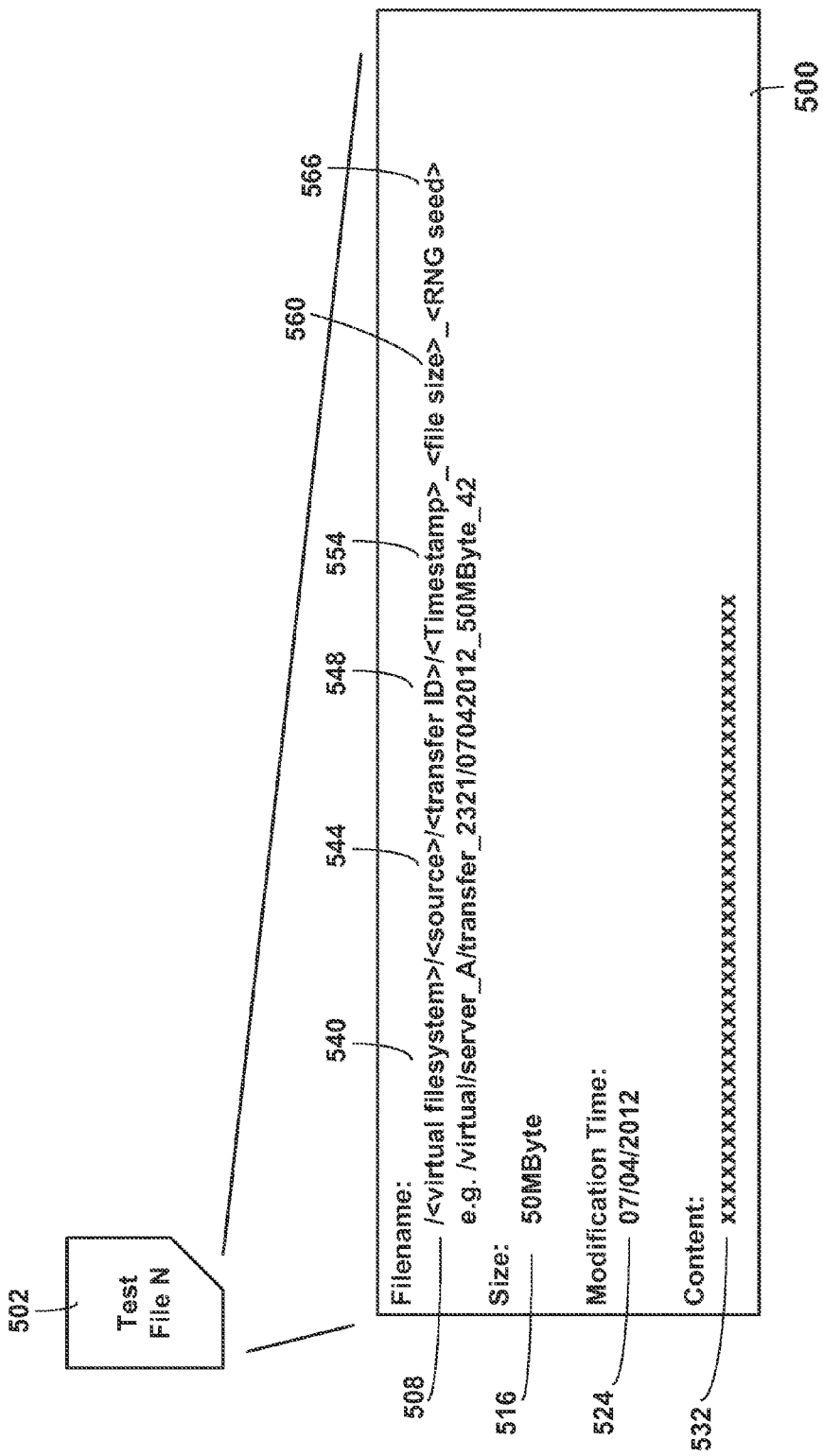
FIG. 5 is a simplified representation of file characteristics of a test file within a virtual file system in accordance with an implementation of the disclosure.

FIG. 5 is a simplified representation of file characteristics 500 of a test file 502 within a virtual file system, such as virtual file system 424. Like file characteristics 300 of data files 302 in file system 214, test files 502 also include file characteristics 500. These file characteristics 500 include filename 508, file size 516, file dates 524, and the content 532 of the file itself. However, the file characteristics 500 of test files 502 may be generated on demand using the filename 508, unlike file characteristics 300 of data file 302 in a regular file system 214 which would be created when data file 302 is stored on the storage system 410.

Like filenames 308 of regular files 302, a filename 508 is a string of characters which identifies a test file 502 and is unique within a virtual file system 424. An example of a filename 508 of a test file 502 is shown in FIG. 5, which includes multiple fields, also known as metadata, within the filename 508 that describes certain properties of test file 502. The different fields may include a virtual file system identifier 540, a source identifier 544, a transfer ID 548, a timestamp 554, a file size 560, and a random number generator seed 566. Each field is included as part of the absolute path of the test file 502 or as part of the name of the test file 502. Each of the fields provides details to the virtual file system 424 on how to handle test file 502. Applications which request test files 502 from the virtual file system 424 use these fields to process test file 502. The other file characteristics 500 of test file 502 may be generated based on the multiple fields of filename 508.

Virtual file system identifier 540 indicates whether a file received by a network system, such as network systems 102 or 104, was generated by a virtual file system 424. By using a special keyword, such as "/virtual/", applications may filter out and identify that the received file is a test file 502 and process it accordingly. For example, a network system may track test files 502 more easily since all of the test files 502 would have "/virtual/" in its absolute path. Real files 302 and test files 502 may be differentiated based on identifying the virtual file system identifier 540. Furthermore, when system resources or data transfers of other applications require more utilization of network 110 or network systems 102 or 104, the virtual file system identifier 540 may identify test files 502 and either cancel or pause the applications which are using these test files 502.

Source identifier 544 indicates the source network system, such as network system 102, from which test file 502 was generated. By identifying the source network system which test file 502 came from, debugging of errors may be performed by traced back from the destination network system to the source network system. Source identifier 544 also allows applications to identify network systems which have a virtual file system 424. If more test files 502 are requested, an application knows that an identified source network system, such as source network system 102, may provide them.

Transfer ID 548 allows an application to track sessions from which test files 502 were created. For example, if a request to generate a thousand test files 502 was received by virtual file system 424, virtual file system 424 may set transfer ID 548 to a specific identification value, such as "/transfer_2321". Each of the test files 502 generated may have the same transfer ID 548 within its absolute path, allowing applications to identify and track the test files 502 related to the specific transfer ID 548.

Timestamp 554 corresponds to the file time and date 524. Since test file 502 may have file characteristics 500 stored in virtual file system 424, file characteristics 500 may need to be generated. One of these file characteristics 500 may be file dates 524. Timestamp 554 may be used as file date 524 of test file 502. If an application requests file date 524, timestamp 554 may be used to generate file date 524.

File size 560 identifies the size 516 of test file 502. In a file 302 from a non-virtual file system 214, the file size 316 would be a file characteristic 300 which corresponds to the size of the content 332 of the file 302. However, since the test file 502 may not have content stored in memory 408, the file size 560 may be used to generate the actual file size 516 of test file 502.

Random number generator seed 566 provides a seed value for a random number generator to generate content 532 of test file 502. The random number generator may be implemented as a pseudorandom number generator, such as a deterministic random bit generator, which receives the random number generator seed value 566 and provides deterministic pseudorandom values. This allows virtual file system 424 to generate and reproduce content 532 of test file 502 at different instances when needed.

Figure 6:
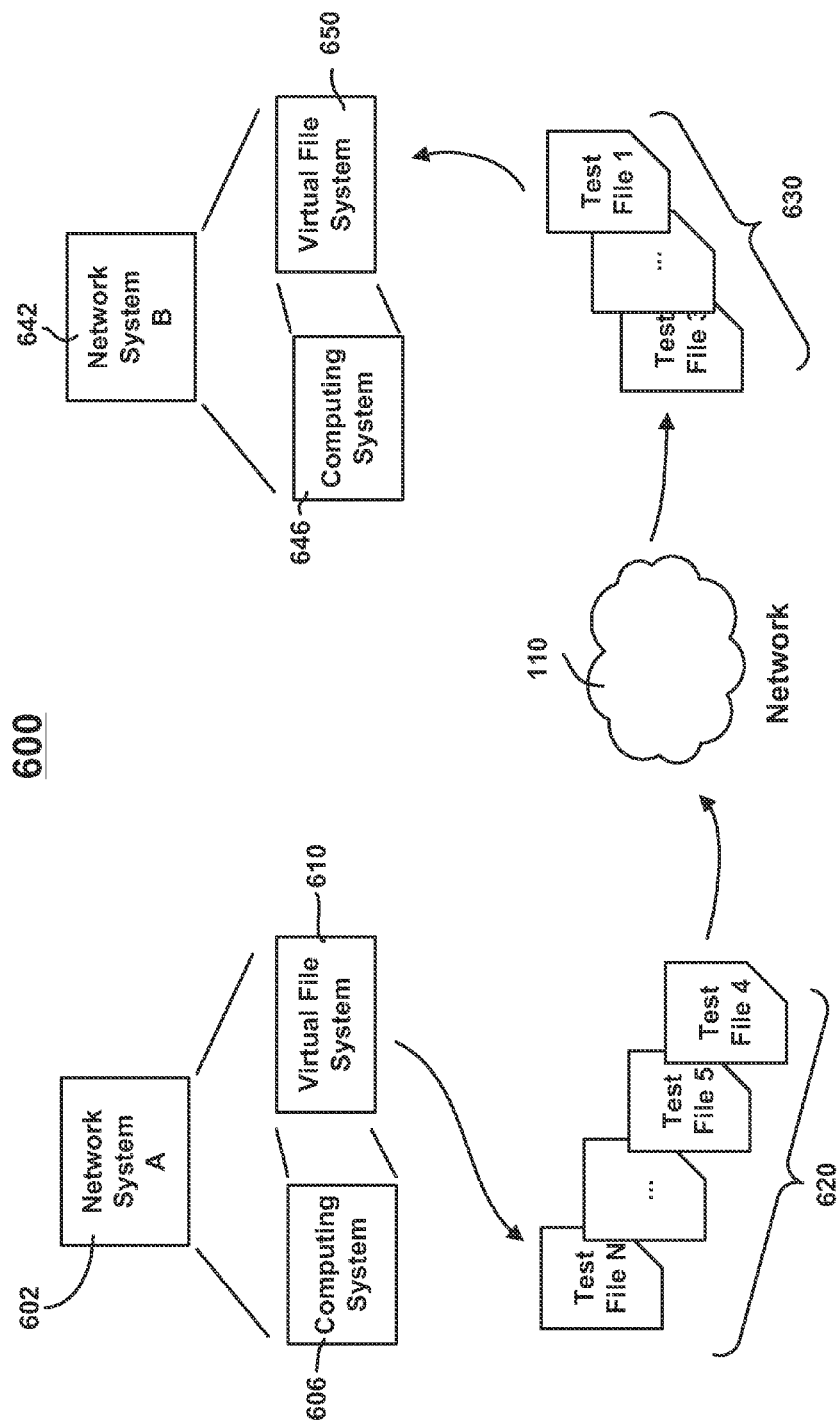
FIG. 6 is a simplified representation of test files being transferred between network systems in accordance with an implementation of the disclosure.

FIG. 6 shows a simplified representation 600 of test files 620 and 630 being transferred between network systems 602 and 642. In order to test and determine the network capacity and network bandwidth of network 110, transfers are set up between different network systems 602 and 642. For example, network system 602 may transfer data to network system 642 through network 110. Instead of using data files 220 from the storage systems 210, network system 602 uses computing system 606 and virtual file system 610, which may be implemented similar to computing system 412 and virtual file system 424, to generate test files 620 and 630 to transfer to network system 642. A benefit of using virtual file system 610 is that the performance of network systems 602 and 642 and the applications and services which run on them, may be determined without the delays generated by storage system 210 and file system 214 which may be present in network systems 602 and 642.

A pre-determined data size of test files 620 is determined to be generated, and is produced by virtual file system 610. Filename 508, which includes the random number generator seed 566 and file size 560, may be used to generate data content 532 for each test file 620 and 630 using a pseudorandom number generator. These test files 620 and 630 are then transferred over network 110 and received by network system 642 and stored into memory 646. Receiving network system 642 receives test files 630 and processes them using its own virtual file system 650. Test files 620 and 630 may be identified using filename 508 of test file 620 and 630. For example, filename 508 may include virtual file system identifier 540 indicating to virtual file system 650 that a received data file is a test file 630. Network system 642 may then utilize filename 508 of test file 630 to verify contents 532 of the received test file 630. Since filename 508 includes random number generator seed 566 and file size 560, a pseudorandom number generator may be used to generate verification data content of received test file 630 and verify the contents 532 of the received test files 630. If contents 532 of the received test file 630 and the generated verification data content do not match, a failure notification may be generated indicating a failure has occurred during the transfer.

In some implementations, a master system may be implemented to configure both the sending network system 602 and the receiving network system 642 for the transfer. The master system may then be configured to determine the network capacity and bandwidth of the network 110. The failure notification of the network systems 602 and 642 may be received by the master system to determine the appropriate actions to take, such as determining where the error in the transfer occurred, or determining the network capacity of the network.

In some implementations, the pre-determined data size of test files 620 may be set to infinite, or a large value which may not be met. The amount of data to be sent may be based on determining whether a pre-determined network capacity or bandwidth threshold has been met. Data for test files 620 would be generated and transferred until an indication that one of the thresholds has been met. For example, if the network bandwidth value settles at a specific value for a pre-determined amount of time, then the network bandwidth and capacity limit may have been reached, and the value of the network bandwidth or capacity may be determined by the settled value.

Figure 7:
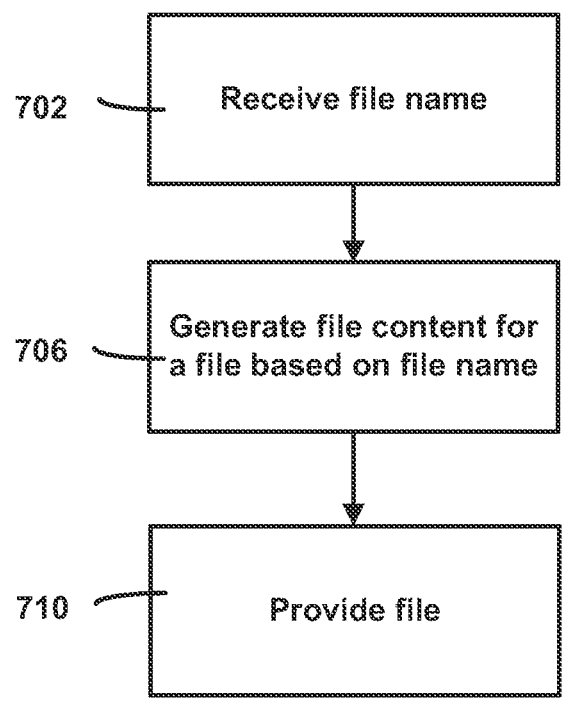
FIG. 7 is a flowchart representation of generating content of a test file in accordance with an implementation of the disclosure.

FIG. 7 shows a flowchart representation 700 of generating content of a test file 502. At 702, a filename 508 for a test file 502 is received by file system 610. A request for test file 502, which provided filename 508, may come from an external application using the file system API or file system 610. Filename 508 includes multiple fields within filename 508. The different fields may include a virtual file system identifier 540, a source identifier 544, a transfer ID 548, a timestamp 554, a file size 560, and a random number generator seed 566. The different fields in filename 508 may be used to generate file characteristics 500 for test file 502, such as file size 516, file date 524, and file content 532. At 706, file content 532 of test file 502 is generated based on the filename 508 of test file 502. File content 532 may be generated based on random number generator seed 566 and file size 560 contained within filename 508. File size 508 indicates the amount of file content 532 which should be generated for test file 502 and random number generator seed 566 is used by a pseudorandom number generator to generate file content 532. In some implementations, file size 508 indicates the total amount of file content 532 that test file 502 may generate. The amount of file content 532 which is generated may be based on the parts of test file 502 requested in the request for test file 502, which should not exceed file size 508. At 710, test file 502, along with its file content 532, is provided back to file system 610 or the application which requested test file 502. Once file content 532 is generated, file content 532 may be stored in memory 606.

A request for a test file 502 may include a read offset and read request length. The read offset provides a method for requesting certain parts of test file 502. For example, the read offset allows a request for file content 532 starting at the middle of test file 502. The read offset may be used with random number generator seed 566 to determine where in the sequence of content generated by a pseudorandom number generator to start generating file content 532. The read request length provides a method for requesting a certain amount of data from test file 502. For example, if test file 502 has a file size 560 of 50 megabytes, the read length may be set to 20 megabytes allowing a request for only 20 megabytes of test file 502. The read request length may also be used by the pseudorandom number generator to generate only a certain amount of file content 532. Either one or both of the read offset and read request length may be omitted in the request. An omitted read offset or read request length may be set as a default value. For example, if the read offset and read request length is omitted, the request may receive the entire file content 532 of test file 502. If the read offset is omitted, the read offset may be set to the beginning of test file 502. If the read request length is omitted, the read request may be set to the amount of data between the read offset and the end of test file 502.

In some implementations, virtual file system 610 may determine if a valid read offset or read request length was requested. The read offset and the read request length may be compared with file size 560 of test file 502. If the read offset added to the read request length is greater than file size 560 of test file 502, then the request is invalid and a failure notification may be generated, indicating to the requestor that an error has occurred.

Figure 8:
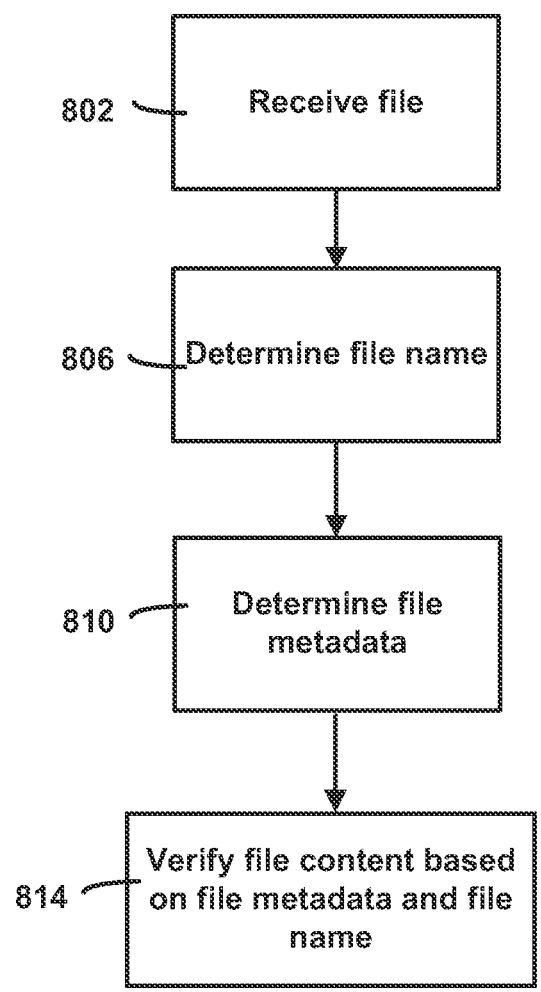
FIG. 8 is a flowchart representation of verifying content of a test file in accordance with an implementation of the disclosure.

FIG. 8 shows a flowchart representation 800 of verifying content of a test file 630. At 802, a test file 630 is received by a network system 642. Test file 630 includes file characteristics 500, such as filename 508, file date 524, and file content 532. At 806, filename 508 of test file 630 is determined. Filename 508 includes multiple fields, or metadata, which describe the properties of received test file 630. At 810, the metadata of filename 508 is determined. The metadata may be determined by parsing filename 508 for specific metadata fields. The metadata includes, among other things, file size 560, random number generator seed 566, and timestamp 554. At 814, file content 532 of test file 630 is verified using the metadata information determined from filename 508. File content 532 may be verified by using file size 560 to generate the determined file size amount of file content 532 of test file 630. Random number generator seed 566 may be used by a pseudorandom number generator to generate the file size amount of file content 532 for verification. By comparing the generated file content with received file content 532 of test file 630, test file 630 may be verified and checked. If file content 532 of the received test file 630 and the generated file content do not match, a failure notification may be generated indicating to the network system 642 that an error has occurred during the transfer of test file 630. This may indicate a failure in the transfer, such as the network capacity being reached, causing data from the data transfer to be dropped. The network capacity may be determined using this failure indicator. File characteristics 500 of test file 630 may also be verified. File characteristics 500 may be verified using the metadata determined from filename 508. File characteristics 500 which were originally generated for test file 630 should correspond to the metadata within filename 508. If file characteristics 500 do not match with the metadata, a failure notification may also be generated, indicating an error has occurred during transfer of test file 630.

It will be apparent to one of ordinary skill in the art that aspects of the present disclosure, as described above, may be implemented in many different forms of software, firmware, and hardware in the implementations illustrated in the figures. The actual software code or specialized control hardware used to implement aspects consistent with the principles of the disclosure is not limiting of the invention. Thus, the operation and behavior of the aspects of the disclosure were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. Further, certain portions of the disclosure may be implemented as "logic" or a "component" that performs one or more functions. This logic may include hardware, such as an application specific integrated circuit or a field programmable gate array, software, or a combination of hardware and software.

While operations are depicted as being performed either by a file system or a separate application which uses an API to access the file system, the operations may be performed by either the file system or application and may be performed in conjunction with one other.

What is claimed is:

1. A non-transitory computer readable medium storing computer executable instructions, which, when executed by a processor, causes the processor to carry out a method for generating content of a file in an in-memory file system, comprising:
   receiving a filename comprising at least one file metadata, wherein the file metadata comprises a file size of the file, a random seed for generating content of the file, and modification information of the file;
   generating file content for a file based on the filename; and
   providing the file content.

2. The non-transitory computer readable medium of claim 1, wherein the generating file content based on the filename of the file comprises generating the file size amount of file content based on the random seed.

3. The non-transitory computer readable medium of claim 1, wherein generating file content based on the filename of the file comprises generating file content based on a pseudorandom generator initialized using the random seed.

4. The non-transitory computer readable medium of claim 1, wherein the method further comprises receiving a request for the file, the request comprising a file read offset and a read request length.

5. The non-transitory computer readable medium of claim 4, wherein the method further comprises:
   comparing the file read offset and the read request length with the file size of the file; and
   generating a failure notification if the file read offset and the read request length exceeds the file size of the file.

6. The non-transitory computer readable medium of claim 1, wherein the method further comprises generating file characteristics based on the filename.

7. The non-transitory computer readable medium of claim 6, wherein the file characteristics comprise a file size of the file, content of the file, and modification information of the file.

8. The non-transitory computer readable medium of claim 1, wherein the generated file content is stored on the in-memory file system.

9. A non-transitory computer readable medium storing computer executable instructions, which, when executed by a processor, cause the processor to carry out a method for verifying content of a file in an in-memory file system, comprising:
   receiving a file;
   determining a filename of the file;
   determining file metadata from the filename of the file, wherein the file metadata comprises a file size of the file, a random seed for generating content of the file, and modification information of the file; and
   verifying file content of the file based on the file metadata and the filename of the file.

10. The non-transitory computer readable medium of claim 9, wherein verifying the file content of the file comprises:
    generating verification content for the file based on the random seed;
    comparing the file content of the file and the verification content for the file; and
    generating a verification failure notification if the file content of the file does not match the verification content for the file.

11. The non-transitory computer readable medium of claim 9, wherein the file comprises at least one file characteristic, and the method further comprises verifying the at least one file characteristic based on the filename of the file.

12. The non-transitory computer readable medium of claim 11, wherein the method further comprises generating a failure notification if the at least one file characteristic in the file does not match the determined file metadata from the filename of the file.

13. A system for generating content of a file in an in-memory file system, the system comprising:
   a processor;
   a memory storing computer executable instructions, which, when executed by the processor, cause the processor to direct the system to:
      receive a filename comprising an at least one file metadata, wherein the file metadata comprises a file size of the file, a random seed for generating content of the file, and modification information of the file;
      generate file content for a file based on the filename; and
      provide the file content.

14. The system of claim 13, wherein the system is further directed to generate file content of the file size amount based on the random seed.

15. The system of claim 13, wherein the system is further directed to generate file content based on the filename of the file based on a pseudorandom generator initialized using the random seed.

16. The system of claim 13, wherein the system is further directed to receive a request for the file, the request comprising a file read offset and a read request length.

17. The system of claim 16, wherein the system is further directed to:
   compare the file read offset and the read request length with the file size of the file; and
   generate a failure notification if the file read offset and the read request length exceeds the file size of the file.

18. The system of claim 13, wherein the system is further directed to generate file characteristics based on the filename.

19. The system of claim 18, wherein the file characteristics comprise a file size of the file, content of the file, and modification information of the file.

20. The system of claim 13, wherein the generated file content is stored on the in-memory file system.

21. A system for verifying content of a file in an in-memory file system, the system comprising:
   a processor;
   a memory storing computer executable instructions, which, when executed by the processor, causes the processor to direct the system to:
      receive a file;
      determine a filename of the file;
      determine file metadata from the filename of the file, wherein the file metadata comprises a file size of the file, a random seed for generating content of the file, and modification information of the file; and
      verify file content of the file based on the file metadata and the filename of the file.

22. The system of claim 21, wherein the system is further directed to:
   generate verification content for the file based on the random seed;
   compare the file content of the file and the verification content for the file; and
   generate a verification failure notification if the file content of the file does not match the verification content for the file.

23. The system of claim 21, wherein the file comprises an at least one file characteristic, and the system is further directed to verify the at least one file characteristic based on the filename of the file.

24. The system of claim 23, wherein the system is further directed to generate a failure notification if the at least one file characteristic in the file does not match the determined file metadata from the filename of the file.

25. A system for generating content of a file in an in-memory file system, comprising:
   a first computer system, comprising:
      a processor; and
      a memory containing instructions that, when executed by the processor, cause the processor to direct the first computer system to:
         receive a filename comprising an at least one file metadata, wherein the file metadata comprises a file size of the file, a random seed for generating content of the file, and modification information of the file;
         generate file content based on the filename of the file; and
         provide the file content;
   a second computer system, comprising:
      a processor; and
      a memory containing instructions that, when executed by the processor, cause the processor to direct the second computer system to:
         receive file content of a file;
         determine a filename of the file;
         determine file metadata from the filename of the file, wherein the file metadata comprises a file size of the file, a random seed for generating content of the file, and modification information of the file; and
         verify the file content of the file based on the file metadata and the filename of the file.

26. The system of claim 25, the system further comprising a master computer system, the master computer system comprising:
   a processor; and
   a memory containing instructions that, when executed by the processor, cause the processor to direct the master computer system to:
      configure the first computer system;
      direct the processor of the first computer system to execute the instructions in the memory;
      configure the second computer system; and
      direct the processor of the second computer system to execute the instructions in the memory.

* * * * *